J. STORY,

Assignor to J. W. STORY.

Connecting Parts of Glass or China Ware Utensils.

No. 9,721. Reissued May 24, 1881.

Witnesses.

W. W. Mortimer

A. C. Kiskadden

Inventor

Jno. Story per

F. A. Lehmann,

Atty.

N. PETERS, Photo-Lithographer, Washington, D. C.

UNITED STATES PATENT OFFICE.

JOHN STORY, OF BALDWIN TOWNSHIP, ALLEGHENY COUNTY, ASSIGNOR TO JOHN W. STORY, OF CASTLE SHANNON, PENNSYLVANIA.

CONNECTING PARTS OF GLASS OR CHINA WARE UTENSILS.

SPECIFICATION forming part of Reissued Letters Patent No. 9,721, dated May 24, 1881.

Original No. 224,120, dated February 3, 1880. Application for reissue filed April 4, 1881.

*To all whom it may concern:*

Be it known that I, JOHN STORY, of Baldwin township, in the county of Allegheny and State of Pennsylvania, have invented certain new and useful Improvements in Connecting Parts of Glass or China Ware Utensils; and I do hereby declare the following to be a full, clear, and exact description of the invention, such as will enable others skilled in the art to which it pertains to make and use it, reference being had to the accompanying drawings, which form part of this specification.

My invention relates to an improvement in the manner of connecting parts of glass or china utensils, and it is an improvement on my invention for which a patent was granted me by the United States, bearing date September 9, 1879, No. 219,418.

It consists in blowing the projection or peg around which the bush of soft metal is placed in one piece with the vessel or utensil from which it protrudes, instead of attaching a solid peg to the outside of it. The peg or projection thus being made hollow cannot be broken or knocked off without also breaking the vessel of which it forms part, while a solid peg attached to the outside of the utensil is easily broken off or detached therefrom.

Figure 1:
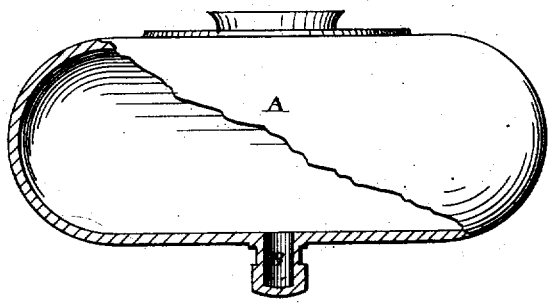
Figure 2:
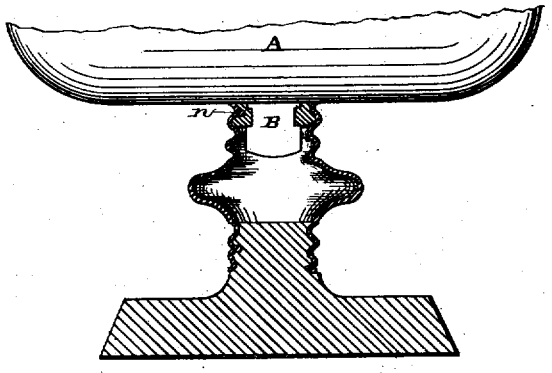

Figure 1 is a view of the lamp-bowl alone, partly in section. Fig. 2 shows the bowl secured to its stand.

A represents the bowl of a glass lamp, at the bottom of which is, for the attachment of the foot of the lamp, a hollow projection or peg, B, blown simultaneously with the bowl. The outside of the peg or projection is preferably made T-shaped, and around it is placed the bush of soft metal, as described in the aforesaid Letters Patent.

My object in blowing the projection or peg B, which forms the point of attachment for another part of the utensil, in one piece with the bowl is to give greater strength than if it were attached to the outside of the bowl by a secondary process, which has to be resorted to if the projection be made solid.

The process of attaching a solid projection or peg of glass to a similar body of less density—such as the bowl of a lamp—is objectionable, because it may readily be broken off, which, when blown in the bowl, cannot happen without destroying or breaking the bowl. It is also objectionable because the contraction of two heated bodies differing in density differs in proportion to their density, and frequently the thinner of the two, cooling more rapidly, is rent or cracked.

To prevent the turning back of the mother-screw surrounding the bush, indentations *n* are made from the outside into the mother-screw and the soft-metal bush within by means of a punch or other instrument. In this simple manner the accidental loosening by unscrewing the foot of a lamp from the bowl is effectually prevented.

I am well aware that the bottom parts of lamp-bowls have heretofore been slightly reduced in size and provided with a screw-thread around the reduced portion, the bowl and the reduced bottom part being blown in a single piece, and this I disclaim. This invention, however, differs from mine in a very great degree. Where the peg has had heretofore to be pressed and then attached to the bowl, I blow the bowl and peg together in a single piece, thus cheapening the construction of the lamp and doing away with all danger of the peg from being broken off.

Having thus described my invention, I claim—

As a new article of manufacture, a lamp-bowl, A, and the hollow peg B, made in a single piece therewith, substantially as shown.

In testimony whereof I affix my signature in presence of two witnesses.

Witnesses: JOHN STORY.

T. F. LEHMANN,

MAX SCHAMBERG.